Nov. 15, 1938.   H. R. E. LIND   2,136,626

AUTOMOBILE HEATER BOOSTER

Filed July 23, 1937

INVENTOR.
HARRY R. E. LIND.
BY HIS ATTORNEYS.
Williamson & Williamson

Patented Nov. 15, 1938

2,136,626

UNITED STATES PATENT OFFICE 2,136,626

AUTOMOBILE HEATER BOOSTER

Harry R. E. Lind, Minneapolis, Minn.

Application July 23, 1937, Serial No. 155,245

2 Claims. (Cl. 257—241)

This invention relates to vehicle heaters of that general type which is used on automobiles and includes means for transferring the heat from the water in the cooling system of the vehicle to the body of the vehicle.

One of the objects of my invention is to provide means for supplementing the normal heat of the water in the cooling system by providing a booster element which will cause the water from the cooling system to absorb heat from the exhaust pipe or muffler, which forms a part of the power plant of the vehicle.

Another object of the invention is to provide a booster element which, due to its shape and proportions, will quickly provide heated water for the radiator of the heater nearly simultaneously with the beginning of the running of the internal combustion engine provided for propelling the vehicle.

Still another object of the invention is to provide a booster unit which may be adjusted quickly and easily to vary the amount of heat which is absorbed from the exhaust gases and transferred to the water in the heating chamber of the booster unit.

These and other objects and advantages of the invention will be more fully set forth in the following description made in connection with the accompanying drawing, in which like reference characters refer to similar parts throughout the several views, and, in which:—

Figure 1:
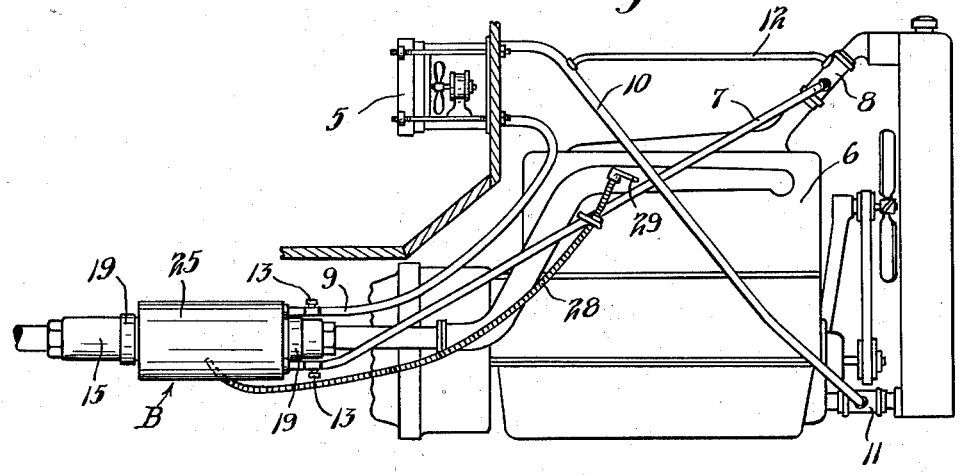
Fig. 1 is a view showing generally the internal combustion engine's radiator, part of the forward passenger compartment and my booster unit connected to the engine and to a conventional automobile heater radiator in side elevation with parts of the motor vehicle structure broken away and in section.
Figure 2:
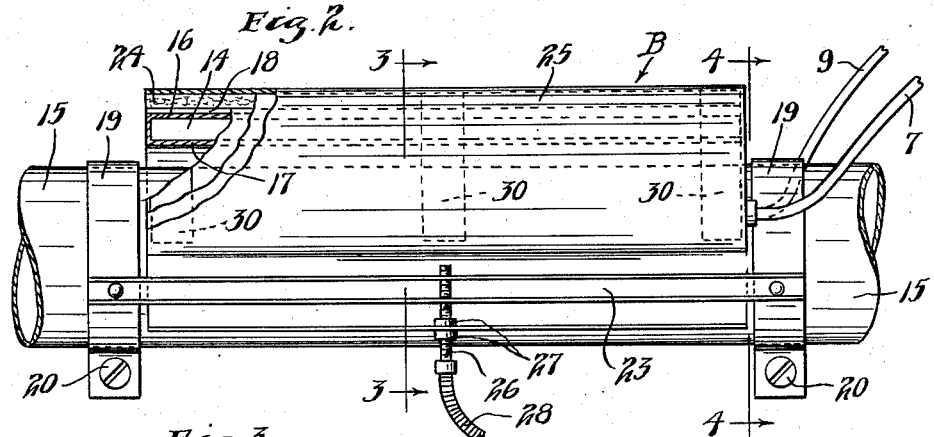
Fig. 2 is an enlarged bottom plan showing a portion of an exhaust pipe and certain parts of the booster element broken away to illustrate interior construction.

In Fig. 1 I have shown a conventional automobile heater radiator 5 which is adapted to be connected to the cooling system of the internal combustion engine 6. A pipe or tubing 7, extends from the upper hose connection 8 backwardly and downwardly to the lower front portion of the booster unit "B". Another tubing 9 extends from the upper side of the booster unit to the lower portion of the radiator 5 and serves as a water inlet for said radiator, and there is a radiator outlet tubing 10 extending from the top of said radiator forward and downwardly to the lower hose connection 11. If desired a suitable cross connection 12 may be provided between the upper portion of the tubing 10 and the upper hose connection 8 so that air entrapped in the radiator 5 will be permitted to escape through to the upper hose connection 8 and out through the usual vent pipe provided for in the standard automobile engine radiator. Furthermore I have provided drain cocks 13 in the tubings 7 and 9 to permit the booster and the car heating radiator 5 to be drained of the water therein.

The booster itself includes an arcuately shaped tank 14 which is preferably shaped upon substantially the same curve as the muffler 15 in an automobile exhaust gas line. The details of the inner-construction of the muffler are omitted for the sake of clarity. The booster tank 14 is provided with relatively closely spaced walls 16 and 17, and if desired one or both of the walls may be provided with grooves 18 extending preferably throughout the length of the heating chamber so that when the booster is applied it may be flexed or bent slightly to insure that the inner wall 17 of the booster heating chamber will lie perfectly flush against the outer surface of the muffler 15.

A pair of metal straps 19 extend around the muffler 15 and are clamped rigidly to said muffler by means of bolts 20 and nuts 21. These straps are positioned just beyond the ends of the booster heating chamber 14 and said straps are connected rigidly by a flat strip 22 and a substantially channel shaped strip 23 more or less oppositely disposed with respect to the circles described by said straps. The heating chamber 14 is preferably covered with a layer of insulating material 24 of any desired type and over this insulation is mounted a metallic cover 25. Said cover extends downwardly and is bent inwardly beneath and is secured to the relatively flat strip 22, and the metal of which said cover is made should be sufficiently flexible to permit a hinge-like swinging movement of the main portion of the cover relative to said strip 22. The opposite edge of the cover extends beyond the insulation and heating chamber 14 to a point beneath and beyond the channel shaped element 23, and the extreme edge of the cover is bent outwardly at right-angles and provided with an aperture intermediate its ends to receive a screw element 26. Collars 27 on either side of the edge of the cover 25 maintain the screw 26 in the same relative position to the edge of said cover. The upper threaded portion of the screw 26 is threadedly received through the central portion of the channel shaped element 23 so that when said screw is rotated by means of the flexible cable 28 connected thereto, the cover will be moved beneath said channel shaped element and the main portion of the cover will be moved slightly toward and away from the muffler 15. The flexible cable 28 may extend to any suitable position with respect to the vehicle and may be provided with a handle 29 so that it is easily rotated.

Figure 3:
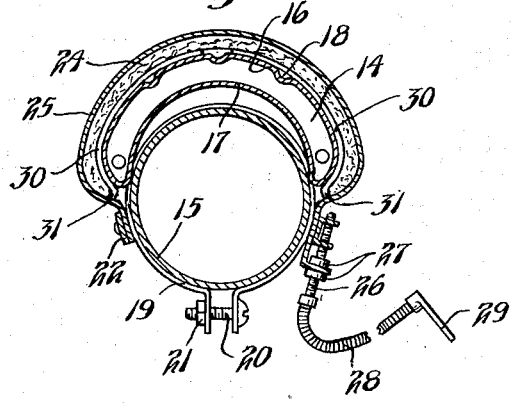
Fig. 3 is a vertical section through the booster element and exhaust pipe taken on the line 3—3 of Fig. 2.
Figure 4:
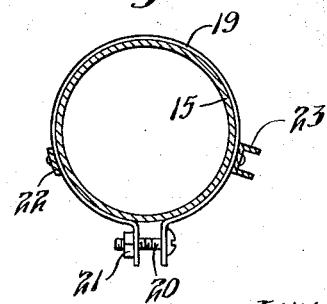
Fig. 4 is a section taken on the line 4—4 of Fig. 2.

Between the outer wall of the booster heating chamber 14 and the layer of insulation 24 I have provided several pairs of strips of metal 30 which are secured at their lower ends in the position shown in Fig. 3 to the underside of the cover at 31, and the upper portions of said straps 30 are secured by soldering or welding to the outer wall 16 of the heating chamber 14. It is preferred that the straps be separated between their ends in the manner shown in Fig. 3 so that expansion and contraction under rather intensive heat and subsequent cooling will not cause the straps 30 to become loosened from the heating chamber.

From the foregoing description it will be seen that the booster unit can be quickly applied to an automobile muffler and the like by securing the encircling straps 19 and then making the proper tubing connections. There is no necessity for altering the structure of the muffler. There is no need for tapping holes in the muffler or exhaust pipe to accommodate connecting studs and the slight bendability of the booster unit permits quick and simple adjustment of the arcuate shape so that the inner wall 17 of the heating chamber 14 will lie flush against said muffler or exhaust pipe. With this flush contact it is possible in a very short time to transmit heat from said muffler to the water in the cooling system of the vehicle and heat the interior of the vehicle very soon after the internal combustion engine has begun to operate.

On the other hand if the booster is providing more heat than is desired it is necessary only to rotate the flexible cable 28 causing the screw 26 to move inwardly toward and through the channel shaped supporting element 23, and, as a result, moving the heating chamber 14 away from the surface of the muffler. This not only moves the heating chamber and the muffler out of contact, but provides an air space through which a considerable amount of air can flow and prevent the transmission of heat from the muffler across the space provided to the heating chamber 14. It has been found that it is not necessary to make such an adjustment in the position of the booster except when there has been a decided change in temperature in the atmosphere, but when such adjustments are desired they can very quickly be made. Thus the degree of heat transmitted into the interior of the vehicle body can be very accurately controlled.

The proportions and relative sizes of the parts of the booster unit shown in the drawing have been considerably distorted in some respects to more clearly bring out the details of construction. It is preferred that the heating chamber 14 be relatively thin so that only a small amount of water spread out over a considerable area is heated at one time with the result that such water is, of course, very rapidly warmed.

It will, of course, be understood that various changes may be made in the form, details, proportions and arrangement of the parts without departing from the scope of my invention.

What is claimed is:

1. In a hot water heater adapted for use in connection with a muffler of an automobile and the like, an arcuate water heating chamber shaped to lie flush around a portion of said muffler or similar heated object, said heating chamber having relatively closely spaced inner and outer walls, a rigidly positioned muffler engaging element, one longitudinal edge of said heating chamber being yieldably secured to said muffler engaging element and the other longitudinal edge of said heating chamber being adjustably connected to said engaging element, whereby said heating chamber can be swung toward or away from said muffler to vary the amount of heat transferred from the muffler to the heating chamber.

2. In a hot water heater adapted for use in connection with a muffler of an automobile and the like, an arcuate water heating chamber shaped to lie flush around a portion of said muffler, at least one wall of said heating chamber having longitudinal grooves formed therein to permit bending of said heating chamber and insure proper fitting of the heating chamber with respect to the individual muffler to which it is applied, bands rigidly secured around said muffler and beyond the ends of said heating chamber, a rigid element extending between said bands and yieldably connected to said heating chamber, a second rigid element at the opposite side of said heating chamber and secured between said bands, said second rigid element having a threaded opening therethrough, a bolt threaded into said opening, and means connected between said heating chamber and said bolt and movable longitudinally with said bolt and causing said heating chamber to be moved toward and away from said muffler when said bolt is moved in the threaded opening in said second rigid element.

HARRY R. E. LIND.